United States Patent [19]

Domkowski

[11] Patent Number: 4,652,528
[45] Date of Patent: Mar. 24, 1987

[54] INFORMATION CARRIER AND METHOD OF USE

[75] Inventor: Ron Domkowski, Arlington Heights, Ill.

[73] Assignee: Halogen Insulator & Seal Corp., Elk Grove, Ill.

[21] Appl. No.: 640,676

[22] Filed: Aug. 13, 1984

[51] Int. Cl.$^4$ .................... B32B 27/00; G01N 37/00
[52] U.S. Cl. .................... 436/56; 428/422; 436/149
[58] Field of Search .................... 436/56, 149; 422/67, 422/116; 156/629, 630, 633, 632, 272, 8, 253, 268; 364/468; 235/375, 385; 250/559, 571; 427/393.5; 428/422

[56] References Cited

U.S. PATENT DOCUMENTS

| | | | |
|---|---|---|---|
| 2,866,723 | 12/1958 | West | 428/422 |
| 3,047,421 | 7/1962 | Taylor | 428/422 |
| 3,469,848 | 9/1969 | Mulay | 428/422 |
| 3,715,856 | 2/1973 | Borel | 156/268 |
| 3,930,924 | 1/1976 | Oka et al. | 156/268 |
| 3,935,427 | 1/1976 | Geul | 235/375 |
| 4,176,260 | 11/1979 | Ward et al. | 235/385 |
| 4,476,149 | 10/1984 | Poppe et al. | 235/375 |

*Primary Examiner*—Barry S. Richman
*Assistant Examiner*—C. M. Delahunty
*Attorney, Agent, or Firm*—Fitch, Even, Tabin & Flannery

[57] ABSTRACT

An information carrier for recording information concerning a product. The carrier is formed of a fluoroplastic and is adapted to be affixed to the product. It includes a first side for facing a component of the product and a second side remote from the first side. The strip also includes an interior portion disposed between the sides with the interior portion having a color sharply contrasting with that of the second side. Thus, discrete bar-like segments of the second surface can be removed to expose the sharply contrasting color of the interior portion to provide coded information about the product. The carrier is formed of a severe environment resistant fluoroplastic so that it can travel with the component through severe environment processing steps.

4 Claims, 3 Drawing Figures

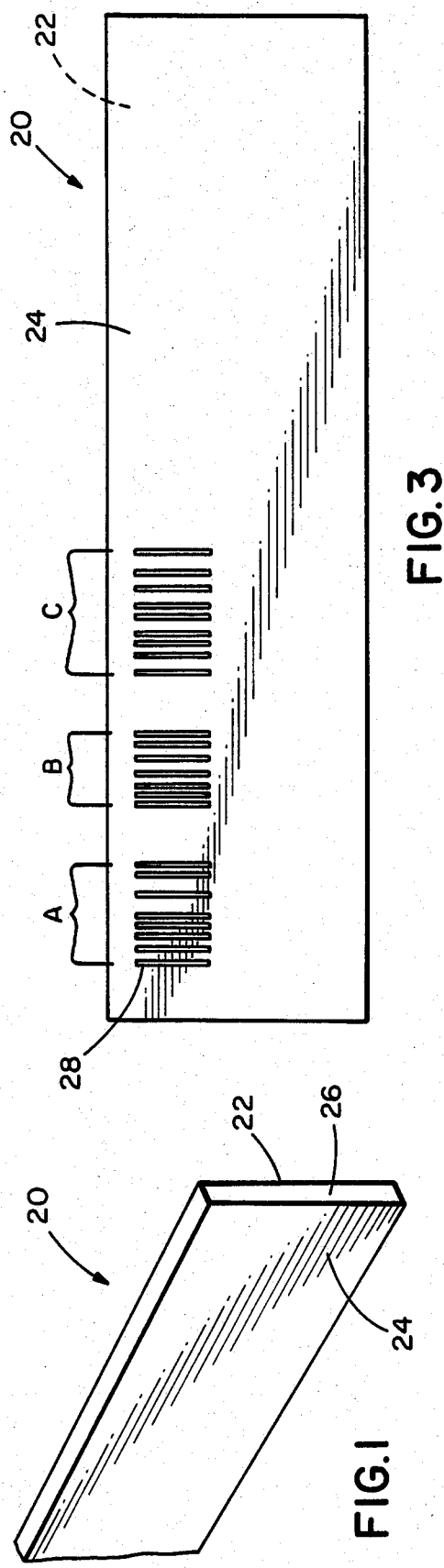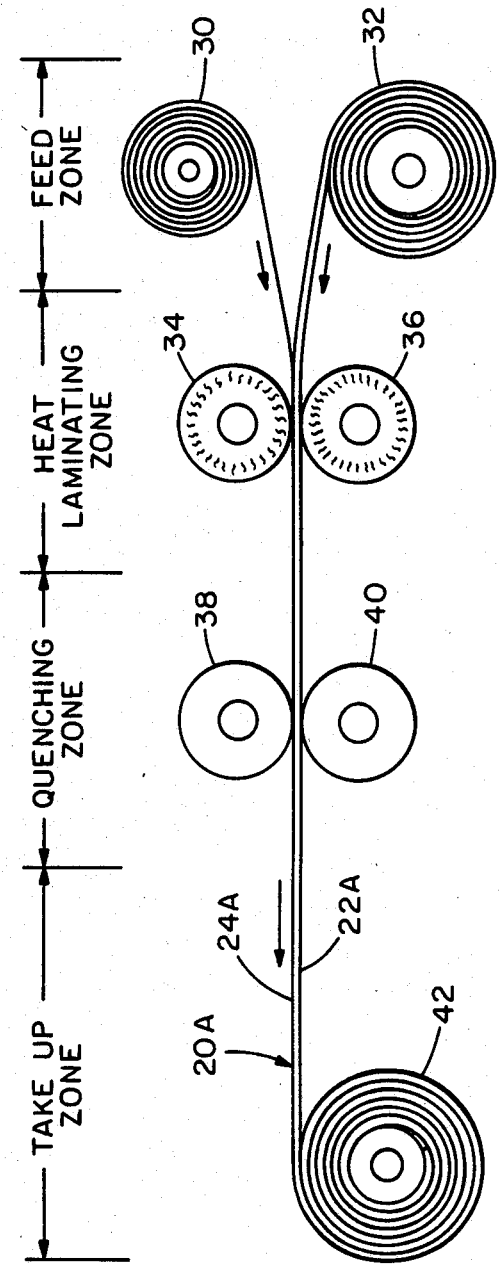

INFORMATION CARRIER AND METHOD OF USE

BACKGROUND OF THE INVENTION

The present invention relates to devices for carrying information concerning a product and, more specifically, to an information carrier carrying coded information regarding a product to which it is adapted to be affixed.

During the manufacture of a product such as an automobile, wherein a variety of equipment or different components is added during the course of the finishing of the product as it travels down an assembly line, there is a need to inform workers at spaced installation stations along the assembly line regarding the precise equipment to be added. A conventional method of supplying such information is to provide a sheet listing the equipment to be added carried in a transparent sleeve which is tied or otherwise held by the product, so that a worker can read the sheet as the product enters his or her installation station to determine if any equipment is to be added at that station.

This method of supplying information is not particularly desirable for use on a high speed assembly line or where there are multiple possibilities or variables in the equipment to be added. The sheet is not especially conducive to being read by automated means. Additionally, it is advantageous in the avoidance or reduction of errors to mate the information carrier and the incipient product at the earliest possible time in the manufacturing process and that the information carrier and product not thereafter be separated. In the manufacture of an automobile, an ideal time for affixing the information is at the time of selection of the frame. However, it is not practicable to install a plastic sleeve holding the equipment listing sheet at this early stage because severe environment steps lie ahead in the manufacturing process. The plastic sleeve would be destroyed or rendered useless if it accompanied the product through, for example, application of the primer or paint, a rust prevention dipping process, or an oven for baking the paint. Of course, separation of the sleeve from the product as the product undergoes severe environment processing and reattachment of the sleeve thereafter is likely to foster errors in that a sleeve might be lost or reattached to the wrong product.

It has been proposed to attach a transponder to the frame for scanning at various points on the assembly line. A transponder is a re-programmable chip that causes emission of a unique signal when it is passed through a magnetic field. The transponder can contain information regarding the type of model, color and option content of the vehicle. Transponders are so expensive that they are removed from the vehicle at the end of the assembly line for reuse. Their use has not been widespread because of the fear that they deteriorate over time.

SUMMARY OF THE INVENTION

Among the several objects of the present invention may be noted the provision of an improved information carrier for carrying information regarding a product. Another object is to provide an information carrier in the form of a strip which is easy to attach to the product and which can accompany the product through severe environment processing steps and remain usable. An additional object is the provision of a strip which can be marked to carry information through the use of a machine, specifically a laser, and from which the information can be easily read using a machine such as a code reader. Other objects of the present invention include the provision of a coded strip which is reliable in use, has long service life and is simple and economical to manufacture. Additional objects and features of the present invention will be in part apparent and in part pointed out hereafter in the following specification and attendant claims.

Briefly, a coded information carrier of the present invention for recording information concerning a product is adapted to be affixed to the product and includes a first side for facing the product and a second side remote from the first side. The strip also has an interior portion disposed between the sides and having a color sharply contrasting with that of the second side. Thus, discrete segments of the second surface, for example a series of bars, can be removed to expose the sharply contrasting color of the interior portions thus to provide coded information about the product.

The present invention also includes a method of manufacturing and a method of providing a quality control check, both using the information carrier.

BRIEF DESCRIPTION OF THE DRAWINGS

FIG. 1 is a perspective view of one preferred embodiment of the information carrier of the present invention prior to application of coded information to one side of the carrier;

FIG. 2 schematically illustrates the manufacturing process of an alternative embodiment of the information carrier of the present invention; and FIG. 3 is a front elevational view of the carrier of FIG. 1 mounted on a support and with coded information having been applied to the strip.

Corresponding reference characters indicate corresponding components throughout the several views of the drawings.

DESCRIPTION OF PREFERRED EMBODIMENTS

Referring now to the drawings, one preferred embodiment of an information carrier of the present invention in the form of a strip for carrying bar coded information is generally indicated in FIGS. 1 and 3 by reference character 20. Strip 20 is formed of a fluoroplastic material and comprises a first side 22, a second side 24 remote from the first side and and an interior portion 26 disposed between sides 22 and 24. The strip is adapted to be affixed to a product so that the first side 22 faces the product. This can be accomplished by riveting or bolting the strip to the product, and is preferably effected by adhering the first side 22 to the product. Interior portion 26 has a color sharply contrasting with that of the second side 24 so that, as shown in FIG. 3, discrete bar-like segments of the second surface can be removed thereby exposing the sharply contrasting color of the interior portion to provide coded information about the product. Preferably interior portion 26 has a light color while the second side 24 has a dark color.

As will be apparent to those of skill in the art, the simplified bar coding scheme shown in FIG. 3 is one of many codes which could be used with strip 20. In this scheme the bars 28 are divided into discrete groups (A, B, C) disposed at spaced locations on second side 24 with the absence of bars for a predetermined number of positions indicating the end of the preceeding group and the beginning of the subsequent group. A binary coded format could be employed wherein each grouping could include a predetermined number (e.g., 15) of equally spaced positions. The presence of a bar in a position could represent a binary "1" and the absence of a bar in position would represent a binary "0". For a strip used for the manufacture of automobiles, the A group could be selected to provide the color of the automobile. The bars in the B group could indicate that the product is to be equipped with a four cylinder engine and automatic transmission, while the C group might inform workers at another assembly line station to install a certain radio and speed control. While only three groupings are shown in FIG. 3, it will be appreciated that any number of groupings can be selected, depending on the length of strip 20. Additionally, more than one row of groupings can be used to provide additional information.

Although strip 20 may be formed of several fluoroplastics or combinations of fluoroplastics usable in severe environments including perfluoroalkoxy (PFA), fluorinated ethylene-propylene (FEP), ethylenechlorotrifluoroethylene (ECTFE) and ethylenetetrafluoroethylene (ETFE); the use of polytetrafluoroethylene (PTFE) sold under the name TEFLON, a registered trademark of DuPont, is preferred since this material is particularly resistant to severe environments and because it has excellent release properties. More specifically, in an automotive manufacturing environment, TEFLON is unaffected by +200° C. paint baking ovens and paint and paint solvents "run-off" the coded surface 24 so that the bar code remains machine readable. It has been found that TEFLON can tolerate +260° C. continuously and retains its physical and chemical stability. Among TEFLON's other desirable characteristics are its excellent dielectric constant, its high resistivity so that it acts electrically as an insulator, its reluctance to absorb moisture or chemicals and the fact that it does not outgas in a vacuum.

These are several methods for providing the interior portion 26 and second side 24 with sharply contrasting colors. In a first method, the sides of a length of white TEFLON are subjected to a chemical etchant resulting in the darkening of sides 22 and 24. Preferred etchants are sodium napthelene and sodium ammonia, both of which provide the second side 24 with a sharply contrasting dark color which has excellent retention as long as side 24 is shielded from prolonged exposure to direct sunlight or ultraviolet radiation.

Referring now to FIG. 2, a method of forming an alternate embodiment 20A of the strip of the present invention is shown. Components of strip 20A corresponding to those of strip 20 are designated by the reference numeral applied to the strip 20 component with the addition of the suffix "A". In this method of providing a length of laminated TEFLON, a feed roll 30 of dark colored TEFLON PFA film and a roll 32 of light colored TEFLON tape or strip are disposed spaced in a feed zone. The components are brought together under pressure and at elevated temperature by a pair of heated metal rollers 34, 36 in a heat laminating zone causing the layers to adhere to one another. The working surfaces of rollers 34, 36 are preferably treated with a release agent such as silicone to prevent sticking to the rollers. After the lamination is cooled due to passage between a pair of cold rollers 38, 40 in a quenching zone, the laminated length is wound on a take up spool 42. The PFA film preferably has a thickness in the range of 0.001 to 0.002 inches while the TEFLON tape has a thickness of about 0.032 inch.

The strip could also be formed by composite molding or dual extrusion methods. In composite molding layers of white and black (or similarly dark) pigmented TEFLON are packed in a mold and pressed together. In dual extrusion the flow of a light pigmented fluoroplastic merges with the flow of a dark pigmented fluoroplastic just prior to their common departure through a die aperture.

It will be appreciated that several methods, including cutting and burning, might be employed to remove segments of second side 24 to expose the sharply contrasting bars 28. However, the fastest method for providing the coding and which provides the greatest clarity and thus the greatest density of information calls for the segments to be removed with the use of a laser. With reference to strip 20 wherein side 24 is darkened due to etching, maximum information density can be achieved through the use of a state of the art computer controlled laser operating in the far ultraviolet wavelengths. Such lasers can produce bars as small as five micrometers wide by providing beams which, rather than burning the material away, remove segments by molecular excitation which breaks the chemical bonds holding the material together. It has been found that in exposing plastic such as Mylar, a trademark of DuPont for film of polyethylene terephthalate resin, and TEFLON to lasers that the materials have an intensity threshold to a laser beam. Laser radiation above the threshold results in ejection of molecules from the irradiated area. The use of such state of the art lasers likely represents considerable overkill for a typical industrial use. However, should the requirements of a particular application warrant, extremely dense packaging of information on strip 20 can be achieved. For an automotive application, commercially available lasers can provide sufficiently narrow bars. A strip having nominal dimensions of 1/16 inch by 1¼ inches by 7 inches can easily carry sufficient information on all equipment carried by the automobile and still have room for information on maintenance history, warranty work, etc.

In one automotive application, a strip 20 carrying information on all equipment on the finished automobile has adhesive applied to first side 22 so that the strip can be bonded at a predetermined location, for example, on the underside of the frame, during an early stage of fabrication. Code readers can be used at the painting station and at the various installation stations along the assembly line to read the strip and provide the workers with the requirements of the completed automobile. Since the strip has excellent heat resistance, release properties and resistance to chemical attack; the strip can survive the several severe environments experienced during painting and baking without any reduction in the readability of the bar coded information. Since the strip accompanies the car throughout the life of the car, the strip can be read at the automotive dealer to provide warranty information regarding the equipment on the car or recommended service intervals which is particularly useful when the piece of equipment of interest is hidden or not readily accessible.

In a related automotive manufacturing application, a second strip initially without coded information could also be applied early in the fabrication process. Information could be added to this second strip at various stations contemporaneous with the occurrence of each event or the addition of each piece of equipment to provide a record of what actually happened with respect to the product. At the conclusion of fabrication, a comparison could be made between the first strip, containing information on what the automobile should include, and the second strip, containing information as to what the automobile does include, to determine if any error has taken place.

The strip 20 is particularly useful in ultramodern automotive assembly employing robotics. The strip reader at each station reads the strip and informs the robot(s) it controls which equipment is to be installed at the station. Thus, the possibility of erroneous equipment installation or omission is virtually eliminated.

While the use strip 20 has heretofore been described regarding the manufacture of automobiles, it will be appreciated that the strip has many other uses where it is desired to record events occurring with respect to a product or to provide a listing of events that should occur during the manufacture or processing of a product. For example, strip 20 could be used on a chemical reaction system in the discrete segment removal manner described above or inside a chemical reaction system to identify chemical batches produced and to provide traceability, history, chemistry, etc., information.

Still another area of application for the information carrier of the present invention concerns providing traceability of critical or technical chemicals, which may be monitored by a Governmental agency such as the Occupational Safety and Health Administration (OSHA) or the Food and Drug Administration (FDA). The information carrier 20, in strip or disk form, can simply be placed in a container along with the chemical. The TEFLON bar coded information carrier is resistant to attack by many otherwise caustic chemicals. Even after the passage of time, a particular chemical batch can be identified by draining the chemical's container or otherwise retrieving the submerged information carrier and reading it.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. A method of providing a quality check on the manufacturing of a product including a component which is present during a number of sequential manufacturing cperations, using an information carrier comprising:
    (1) a colored outer surface lamella;
    (2) an interior portion having a color sharply contrasting with that of said outer surface lamella; and
    (3) means for attaching said carrier to said product in such a manner that said outer surface lamella remains visible to an observer of said product, said carrier being formed primarily of material selected from the group consisting of polytetrafluoroethylene, perfluoroalkoxy (PFA), fluorinated ethylene-propylene (FEP), ethylene-chlorotrifluoroethylene (ECTFE), and ethylene-tetrafluoroethylene (ETFE); said carrier being adapted to bear codes formed by the removal, at a time subsequent to the formation of said outer surface lamella and said interior portion as joint parts of a coherent body during the manufacture of said carrier, of discrete segments of said outer surface lamella, thereby exposing the sharply contrasting color of said interior portion to provide coded information about said product, said coded information being conveyed by the spacing and number of the areas of sharp color constrast thus formed, said method comprising the following steps:
    (a) affixing said information carrier to said component prior to said manufacturing operations, said carrier having a section of its outer surface lamella free from any removal of discrete segments of said lamella;
    (b) removing discrete segments of said section of said outer surface lamella to expose said interior portion contemporaneously with the occurrence of a predetermined manufacturing operation to record on said carrier information concerning that operation;
    (c) repeating step (b) with respect to subsequent manufacturing operations; and
    (d) comparing, after completion of said manufacturing operations, the information contained on said carrier with inforamtion with respect to a properly manufactured product to determine the existence of any deviation from intended operations during the manufacture of the product.

2. A method as set forth in claim 1 wherein said discrete segments are removed by use of a laser.

3. A method as set forth in claim 1 wherein said component is the frame of a vehicle and wherein certain of said manufacturing operations include installation of preselected vehicular equipment.

4. A method of providing current information about the chemical nature of the contents of a container, using an information carrier comprising:
    (1) a colored outer surface lamella;
    (2) an interior portion having a color sharply contrasting with that of said outer surface lamella; and
    (3) means for attaching said carrier to said product in such a manner that said outer surface lamella remains visible to an observer of said product, said carrier being formed primarily of material selected from the group consisting of polytetrafluoroethylene, perfluoroalkoxy (PFA), fluorinated ethylene-propylene (FEP), ethylene-chlorotrifluoroethylene (ECTFE), and ethylene-tetrafluoroethylene (ETFE); said carrier being adapted to bear codes formed by the removal, at a time subsequent to the formation of said outer surface lamella and said interior portion as joint parts of a coherent body during the manufacture of said carrier, of discrete segments of said outer surface lamella, thereby exposing the sharply contrasting color of said interior portion to provide coded information about said product, said coded information being conveyed by the spacing and number of the areas of sharp color contrast thus formed, comprising the steps of:
    (a) affixing to said container said information carrier, said carrier bearing on a first section of its outer surface lamella coded information about the initial chemical nature of said contents and having a second section of its outer surface lamella initially free from any removed discrete segments;
    (b) subjecting said contents to a processing step which changes the chemical nature of the contents and contemporaneously removing discrete segments of said second section of the outer surface lamella of said carrier to expose said interior portion to generate thereon coded information about the chemical nature of the contents after said processing step; and (c) reading said coded information generated in step (b) to determine the resulting chemical nature of said contents of said container due to said processing step.

* * * * *